US008788324B1

(12) United States Patent
Shetty et al.

(10) Patent No.: US 8,788,324 B1
(45) Date of Patent: Jul. 22, 2014

(54) PREFERRED PAYMENT TYPE (75) Inventors: Arjun Shetty, Seattle, WA (US); Mary Kay Bowman, Seattle, WA (US); Peter S. Vosshall, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 956 days.

(21) Appl. No.: 11/956,727

(22) Filed: Dec. 14, 2007

(51) Int. Cl.
*G06Q 30/00* (2012.01)

(52) U.S. Cl.
USPC ... 705/14.1; 705/14.2; 705/14.23; 705/14.25; 705/14.39

(58) Field of Classification Search
USPC ............. 705/14, 14.1, 14.11, 14.16, 14.23, 705/14.24, 14.25, 14.31, 14.36, 14.2, 14.3, 705/14.39, 35, 39
See application file for complete search history.

(56) References Cited

U.S. PATENT DOCUMENTS

| | | | | |
|---|---|---|---|---|
| 5,642,485 | A * | 6/1997 | Deaton et al. | 705/14.25 |
| 6,915,271 | B1 * | 7/2005 | Meyer et al. | 705/14.35 |
| 6,965,868 | B1 * | 11/2005 | Bednarek | 705/7.14 |
| 6,999,943 | B1 * | 2/2006 | Johnson et al. | 705/39 |
| 7,104,443 | B1 * | 9/2006 | Paul et al. | 235/380 |
| 7,318,049 | B2 * | 1/2008 | Iannacci | 705/39 |
| 7,587,363 | B2 * | 9/2009 | Cataline et al. | 705/40 |
| 7,716,080 | B2 * | 5/2010 | Postrel | 705/14.27 |
| 2001/0027439 | A1 * | 10/2001 | Holtzman et al. | 705/39 |
| 2002/0052778 | A1 * | 5/2002 | Murphy et al. | 705/14 |
| 2002/0062249 | A1 * | 5/2002 | Iannacci | 705/14 |
| 2002/0072931 | A1 * | 6/2002 | Card | 705/1 |
| 2002/0130176 | A1 * | 9/2002 | Suzuki | 235/380 |
| 2002/0165829 | A1 * | 11/2002 | Jones et al. | 705/72 |
| 2002/0178060 | A1 * | 11/2002 | Sheehan | 705/14 |
| 2002/0198772 | A1 * | 12/2002 | Bates et al. | 705/14 |
| 2003/0009379 | A1 * | 1/2003 | Narasimhan et al. | 705/14 |
| 2003/0163416 | A1 * | 8/2003 | Kitajima | 705/39 |
| 2003/0191709 | A1 * | 10/2003 | Elston et al. | 705/40 |
| 2003/0216967 | A1 * | 11/2003 | Williams | 705/14 |
| 2003/0236748 | A1 * | 12/2003 | Gressel et al. | 705/41 |
| 2004/0024703 | A1 * | 2/2004 | Roskind | 705/40 |
| 2004/0039644 | A1 * | 2/2004 | Postrel | 705/14 |
| 2004/0122736 | A1 * | 6/2004 | Strock et al. | 705/14 |
| 2004/0215560 | A1 * | 10/2004 | Amalraj et al. | 705/40 |
| 2004/0267643 | A1 * | 12/2004 | Armes et al. | 705/30 |
| 2004/0267662 | A1 * | 12/2004 | Armes et al. | 705/40 |
| 2005/0021400 | A1 * | 1/2005 | Postrel | 705/14 |
| 2005/0021460 | A1 * | 1/2005 | Teague et al. | 705/40 |
| 2005/0021462 | A1 * | 1/2005 | Teague et al. | 705/40 |
| 2005/0086139 | A1 * | 4/2005 | Blackman | 705/35 |
| 2006/0031158 | A1 * | 2/2006 | Orman | 705/38 |
| 2006/0143124 | A1 * | 6/2006 | Ehrke | 705/40 |
| 2006/0178986 | A1 * | 8/2006 | Giordano et al. | 705/40 |
| 2006/0247973 | A1 * | 11/2006 | Mueller et al. | 705/14 |
| 2006/0259364 | A1 * | 11/2006 | Strock et al. | 705/14 |
| 2006/0271441 | A1 * | 11/2006 | Mueller et al. | 705/14 |
| 2006/0287917 | A1 * | 12/2006 | Graham, Sr. | 705/14 |
| 2007/0005498 | A1 * | 1/2007 | Cataline et al. | 705/42 |

(Continued)

*Primary Examiner* — Kenneth Bartley
(74) *Attorney, Agent, or Firm* — Lee & Hayes, PLLC (57) ABSTRACT

Creation and placement of rewards associated with preferred payment types enables a merchant to incentivize a customer for selecting the preferred payment types. A number of payment types may be presented to a customer, where at least one payment type is a preferred payment type with an associated reward. The reward may be transmitted to the customer if the customer satisfies conditions for obtaining the reward. The conditions may include using the preferred payment type, applying for the preferred payment type, or making the preferred payment type the default payment type, among other possibilities.

25 Claims, 7 Drawing Sheets

(56) References Cited

U.S. PATENT DOCUMENTS

| | | | |
|---|---|---|---|
| 2007/0043613 A1* | 2/2007 | Longest | 705/14 |
| 2007/0045407 A1* | 3/2007 | Paul et al. | 235/380 |
| 2007/0156533 A1* | 7/2007 | Hammond et al. | 705/14 |
| 2007/0162387 A1* | 7/2007 | Cataline et al. | 705/40 |
| 2008/0015979 A1* | 1/2008 | Bentley | 705/38 |
| 2008/0027814 A1* | 1/2008 | Kulakowski et al. | 705/14 |
| 2008/0033825 A1* | 2/2008 | Goldin | 705/14 |
| 2008/0133409 A1* | 6/2008 | Eastley et al. | 705/40 |
| 2009/0018909 A1* | 1/2009 | Grecia | 705/14 |
| 2009/0018924 A1* | 1/2009 | Roberts | 705/21 |
| 2009/0112659 A1* | 4/2009 | Mullen et al. | 705/7 |
| 2009/0112660 A1* | 4/2009 | Mullen et al. | 705/7 |
| 2009/0112662 A1* | 4/2009 | Mullen et al. | 705/7 |
| 2009/0112766 A1* | 4/2009 | Hammad et al. | 705/44 |
| 2009/0119204 A1* | 5/2009 | Akella et al. | 705/39 |
| 2009/0125441 A1* | 5/2009 | Minges et al. | 705/39 |
| 2010/0131840 A1* | 5/2010 | Walker et al. | 715/234 |
| 2010/0179870 A1* | 7/2010 | Postrel | 705/14.29 |
| 2011/0022448 A1* | 1/2011 | Strock et al. | 705/14.1 |

* cited by examiner

Payment Type Sign Up

302 http://www.website.com/signupform

Easy sign up for Website.com Credit Card  [Continue]

304

Congratulations! You have been pre-approved! Please enter the requested information below to complete your application.

306

Applicant Information

John Q. Customer    123 Maple Ave.    Anywhere    State    99999 jqcustomer@webmaster.com    (999) 555-1234    [Make corrections]

310

308

Time at Residence: [▼]  ○ Own  ○ Rent    Employer [    ]
Rent/Mortgage per month [    ]            Position [    ]
Birth date: --/--/----                    Work Phone [    ]
Social Security No. ---/--/----           Annual Salary [    ]

312

Bank Account Information
Bank Name        Bank Acct No.    Name on Account
[    ]           [    ]           [    ]

314

[Legal Notices]   [Contact a Representative]
[Terms]

[No thanks]  [Continue]

PREFERRED PAYMENT TYPE

BACKGROUND

With the continuing rise of e-commerce, merchants seek opportunities to stay competitive among growing competition. Merchants also strive to exploit opportunities that provide an enhanced purchasing environment to attract new customers and retain existing customers. In the past, traditional techniques like advertising and website navigation features may have been effective to retain customers and maintain a profitable e-commerce website. However, as customers have become more comfortable transacting on the Internet, merchants have been forced to focus on reducing costs to remain competitive among the growing number of merchants offering similar goods and services on the Internet.

More specifically, merchants offering goods and services on the Internet vigilantly look for any opportunity to reduce costs without compromising their product or service, thus allowing them to maintain profit margins despite increased price competition. For example, reducing overhead and operating costs may enable a merchant to reduce product prices and maintain target profit margins while having negligible adverse effects on products add services.

In addition, merchants strive to promote and reward loyalty among customers. For example, providing give-aways, frequent purchaser incentives, and other incentives to customers typically helps a merchant increase the likelihood of return visits by those customers. Accordingly, among other potential improvements, there remains a need to reduce merchant transaction costs while maintaining, or improving, a customer's shopping experience.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Embodiments of the present disclosure are directed to, among other things, preferred payment types for completing a transaction involving particular elements made remotely available, such as over a wide area network (e.g., the Internet) or available by another distributed communication. As an overview, elements may include products, services, sellable units, user profiles, customer-created content (e.g., artwork), or anything else which might be purchased and include a payment transaction.

A merchant may enable a customer to use any number of payment types to complete a transaction including one or more elements. In some instances, the customer may use a credit card such as Visa®, MasterCard©, Diners Club®, American Express®, Discover®, Japan Credit Bureau (JCB), or another credit card or debit card when purchasing elements. In addition, the merchant may allow the customer to use other payment types. For example, some merchants may allow customers to pay using direct withdrawals from the customer's bank account, often referred to as an "electronic withdrawal" or an "e-check." Traditional payment types including cash, checks, money orders, credit accounts, and purchase orders may also be used by the customer to submit a payment to the merchant for the elements included in the transaction.

Each payment type has a processing cost. The processing cost may include an administrative cost (e.g., clerk time necessary to count cash or expense to configure a system to process e-checks). In addition, the processing cost may include non-administrative costs which may account for risk of fraud, bank charges (e.g., credit card premiums), or other costs associated with payment types. Typically, the costs associated with payment types are relatively small and may only reduce the merchant's revenue by a few percentage points. However, when the processing costs are aggregated over time for a large scale business, having sales in the tens of thousands of dollars or more, these payment type processing costs may be become an important cost reduction target for the merchant.

In some implementations, a merchant may have an association with one or more credit cards which they accept for payment, such as a merchant branded version of a credit card. For example, a merchant may sponsor a Visa® credit card which may be serviced and/or provided by a third party bank. The third party bank and the merchant may have an agreement relating to the terms of the credit card which enable the merchant to receive incentives for advertising, distributing, and encouraging use of the merchant credit card.

In embodiments of the disclosure, the merchant may use techniques to direct customers to preferred payment types, such as payment types that include the lowest processing costs or payment types that are profitable for the merchant. In some implementations, the merchant may offer customers rewards for selecting the preferred payment type when completing a transaction. For example, the merchant may expedite shipping, apply an instant savings to a pending transaction, or provide other rewards.

In further embodiments, the merchant may provide a reward to a customer for signing up for a preferred payment type, such as a credit card sponsored by the merchant. For example, a customer may receive a reward after she signs up for the preferred payment type for the first time and then subsequently uses the preferred payment type for the pending transaction.

For purposes of discussion, preferred payment types are described in the context of an e-commerce merchant website. One illustrative implementation of this context is provided below. However, it should be appreciated that the described preferred payment type techniques may be implemented in other contexts. Moreover, other preferred payment types techniques may be performed by the illustrated architecture.

Illustrative System Architecture

Figure 1:
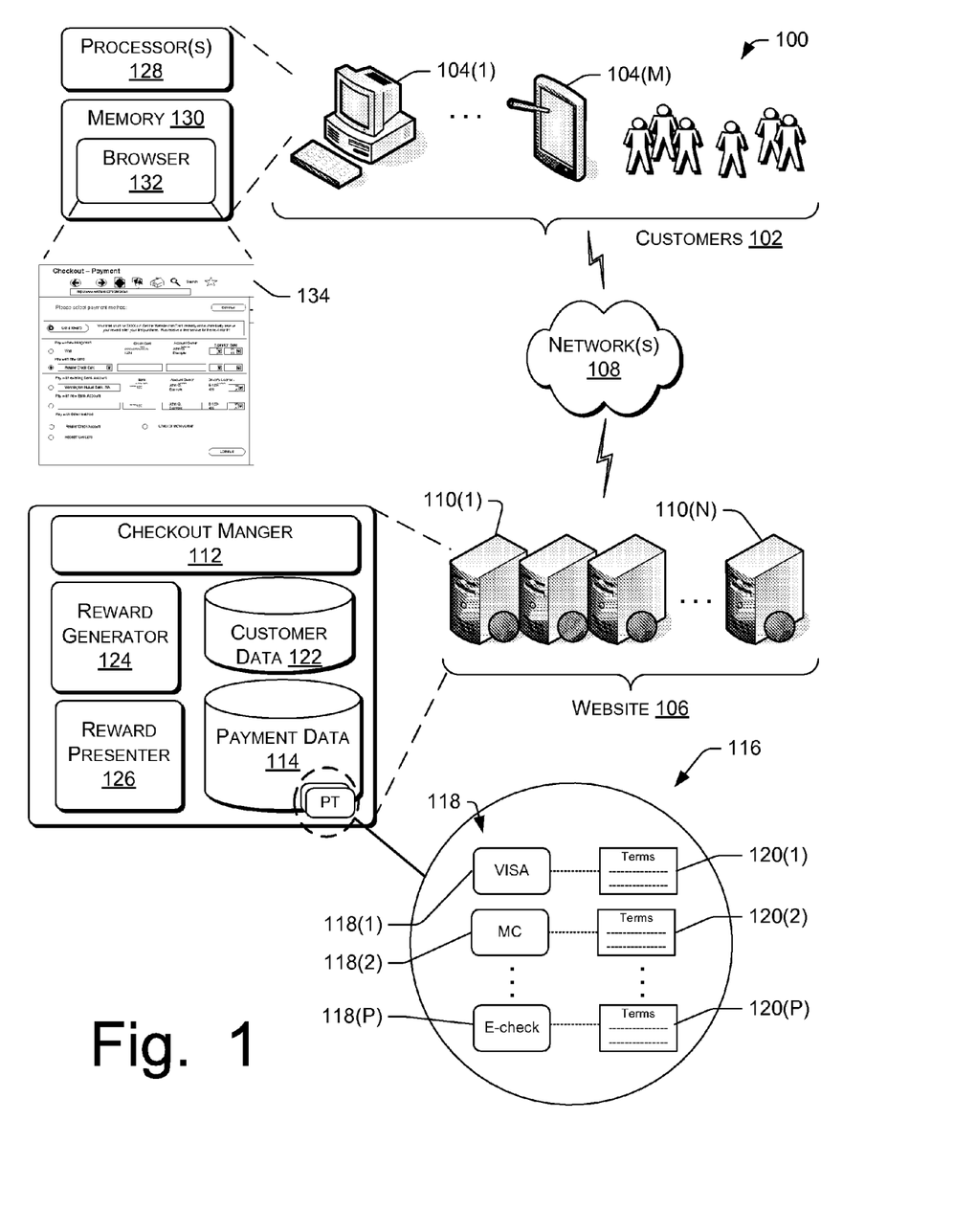
FIG. 1 illustrates an example architecture for implementing payment type preferences. The architecture includes multiple clients coupled via a network to a server system that hosts an e-commerce website, and a checkout manager in communication with payment data.

FIG. 1 illustrates an example architecture 100 for implementing preferred payment types in the context of an e-commerce merchant website. In the architecture 100, the customers 102 may utilize user computing devices 104(1), ..., 104(M) to access a website 106 via a network 108. The network 108 represents any one or combination of multiple different types of networks, such as cable networks, the Internet, and wireless networks.

One or more servers 110(1), ..., 110(N), perhaps arranged in a cluster or as a server farm, host the website 106 or another type of information server. Other server architectures may also be used to host the website 106. The website 106 is capable of handling requests from many users and serving, in response, various web pages that can be rendered at the user computing devices 104(1)-(M). The website 106 can be any type of website that supports user interaction, including online retailers, informational sites, social networking sites, blog sites, search engine sites, news and entertainment sites, and so forth.

In the illustrative environment, the website 106 represents a merchant website that hosts an electronic catalog with one or more items. An item includes anything that the merchant wishes to offer for purchase, rental, subscription, viewing or some other form of consumption that includes a payment to the merchant in exchange for the item. In some embodiments the item may be offered for consumption by the merchant. However, in some embodiments the merchant may host items that others are selling using the merchant's website. An item can include a product, a service, a digital download, a news clip, a user profile, customer-created content, information, or some other type of sellable or non-sellable unit.

In FIG. 1, a checkout manager 112 facilitates collecting and processing customer payment information, which enables a customer, such as one of the customers 102, to complete a transaction. When the customer elects to purchase an element, the customer is directed to a checkout page, otherwise known as a "payment processing page" or "shopping cart page" where the customer can begin completing the transaction. Often, the customer is initially provided with a list of the elements that he or she as elected to purchase. Once the customer is satisfied with the element list, the website 106 may direct the customer to a checkout page.

At the checkout page, the checkout manager 112 accesses payment data 114 to provide payment options 116 on the checkout page. The payment options 116 include payment types 118 that the customer may use to pay for the elements in a transaction. In some implementations, the payment type 118 may not be available for a particular element. For example, a merchant may not accept personal checks or money orders on certain elements, such as electronics or other high dollar value items. The checkout manager 112 enables a website operator to add or remove payment types 118 from the checkout page. When presenting the checkout page, one or more of the servers 110(1)-(N) may retrieve the available payment types 118 associated with the elements listed in the checkout page.

The payment data 114 includes data relating to methods of payment accepted by the merchant including the collection of payment options 116. The payment data 114 is accessible, directly or indirectly, by one or more of the servers 110(1)-(N). Each payment option 116, meanwhile, represents the payment type 118. In addition, each of the payment types 118(1)-(P) may have respective payment attributes 120(1), ..., 120(P) which including information related to the payment type 118, such as associated terms and/or processing costs. For example, the payment type 118(1), such as a credit card, may have payment attributes 120(1) that contain processing costs for administrative and non-administrative costs. In addition, the payment attributes 120(1)-(P) may also include information on the profitability of each payment type 118(1)-(P), such as instances when the payment type may be profitable for the merchant. For other types of payments, the payment attributes 120(1)-(P) may contain different information appropriate for those payment types.

In addition to the payment data 114, the architecture 100 includes customer data 122 that provides information about the customer, such as customer account information, customer purchase information, and other information associated with the customer. FIG. 1 also depicts a reward generator 124, which generates rewards for the payment type 118 based in part on the payment data 114 and the customer data 122. The reward generator 124 may generate a reward for a particular customer for one or more preferred payment types. For example, the reward generator 124 may create a reward in the form of a price reduction, shipping charge discount, or gift card. In some instances, the customer may only have to use the preferred payment type to receive the reward. In other instances, the customer may have to do other tasks, such as make the preferred payment type a default payment type for the customer. For example, the default payment type may be automatically selected when the customer initiates a later transaction, thereby increasing the likeliness that the customer uses the default payment type (i.e., preferred type) during future transactions. The reward generator 124 may generate a reward for a particular customer to encourage the customer to sign up for the preferred payment type. For example, the preferred payment type may be a credit card sponsored by the merchant. In another example, the preferred payment may be e-checks, which may require the customer to submit her bank account information in order to process the customer's payment.

In accordance with embodiments, the reward generator 124 may vary the rewards created for customers for the same payment type 118. For example, the reward generator 124 may create a higher value reward for a return customer with a history of conducting large transactions with the merchant than the reward generator may create for a new customer. This may allow the merchant to reward specific customer behavior, such as customer loyalty, and encourage repeat visits by existing customers.

A reward presenter 126 may present, display, or otherwise communicate the reward created by the reward generator 124 to the customer. The reward presenter 126 may display the reward on the checkout page or on another page that is associated with the checkout page. For example, the reward presenter may include presenting the reward in an information box above the payment types or next to each payment type on the checkout page. In some instances, the reward presenter 126 may use pop up windows or other linked pages to display information from the reward generator 124. The reward presenter 126 may vary reward presentation techniques for some of the customers. For example, if the customer data 122 indicates a first customer is less likely to commit to a purchase than a second customer, the reward presenter 126 may present a single static text box to present the reward to the first customer or may not present a reward. The reward presenter 126 may reroute the second customer to additional information web pages regarding the reward.

As discussed above, the customers may complete a purchase by activating the checkout manager 112 on the website 106. The customer 102 may have a reward created by the reward generator 124, which uses information from at least one of the payment data 114 and the customer data 122. The customers 102 may utilize the user computing devices 104(1)-(M) when making the purchase. The user computing devices 104(1)-(M) may be implemented as any number of computing devices, including as a personal computer, a laptop computer, a portable digital assistant (PDA), a mobile phone, a set-top box, a game console, and so forth. As illustrated, each user computing device is equipped with one or more processors 128 and memory 130 to store applications and data. According to some embodiments, a browser application 132 is shown stored in the memory 130 and executes on the processor 128 to provide access to the website 106. The browser 132 renders web pages served by the website 106 on an associated display. Although embodiments are described in the context of a web based system, other types of client/server-based communications and associated application logic could be used.

When a user (e.g., one of the customers 102) accesses the website 106, the user computing device 104(1) submits a request, such as in the form of a uniform resource locator (URL), to the servers 110(1)-(N). Upon receiving the request, the servers 110(1)-(N) return a web page 134 back to the requesting client computer. In the context of a merchant website, the returned web page 134 may allow the customer to receive a reward associated with a preferred payment type, select a payment, and complete a transaction. In addition, the customer may be directed to an application for a preferred payment type, such as an application for a credit card sponsored by the merchant that hosts the website 106.

Illustrative Preferred Payment Type

Figure 2:
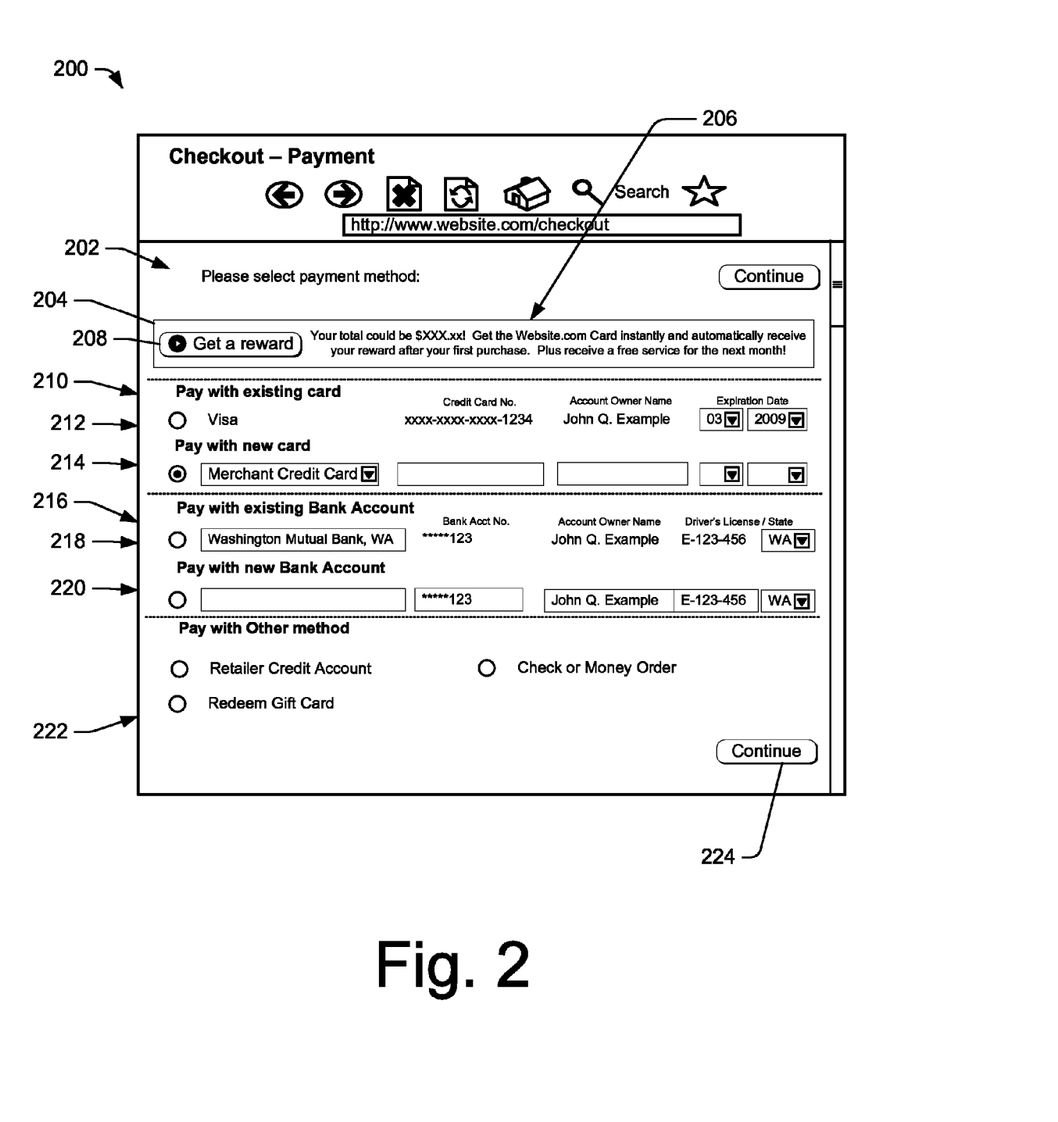
FIG. 2 illustrates an example screen rendering of an e-commerce checkout page including a plurality of payment options and at least one preferred payment type.

FIG. 2 illustrates an example screen rendering of an e-commerce checkout page 200 including a plurality of payment options and at least one preferred payment type. The checkout page 200 includes a message pane 202 with instructional text or other informative text. The payment page 200 may contain a reward information section 204 which may be used to communicate a reward offer to the customer. For example, the reward information section 204 may include a reward for signing up for a preferred payment type, such as a credit card sponsored by the merchant. The reward information section 204 may include a description 206 of the reward, including a total payment price after the reward is applied to a pending transaction. In addition, other rewards may be combined and offered to the customer in the reward information section 204. The reward information section 204 may include a link 208 to another web page that facilitates collecting information from the customer to process the preferred payment type As shown in FIG. 2, the payment page 200 may include a number of payment sections that enable the customer to select a payment type. In some instances, the payment type may be associated with the customer, such as by an account login, which may allow the merchant to save payment types. A credit card section 210 may include existing card data 212 or a new card input 214. In some cases, the existing card data 212 may include a preferred payment type.

The new card input 214 may be automatically populated with a preferred payment type, such as a merchant sponsored credit card. The new card input 214 may allow a customer to enter credit card information for a credit card they already have, such as a Retailer Card(s), Visa®, MasterCard®, Discover®, American Express®, Diners Club, JCB (Japan Credit Bureau), or other credit or debit card. A radio button, or other selector, may be associated with the preferred payment type and may be pre-selected when the checkout page 200 is presented to the customer, thus increasing the likeliness that the customer uses the preferred payment type when completing the transaction. In instances where the customer desires to sign up for the preferred payment type, the customer may use the link 208 in the reward information section 204 to apply for the preferred payment type.

The checkout page 200 may include an e-check section 216, which may have existing e-check data 218, such as the bank account information for the customer. In addition, the e-check section 216 may include a new e-check input 220 which enables the customer to pay with an e-check after the customer inputs his or her bank account information. The checkout page 200 may also include an alternative payment section 222. In some embodiments, the payment types included in the alternative payment section 222 may be selectively available depending on various factors such as the elements included in the transaction, the customer history (e.g., browse history, etc.), the merchant or supplier preferences, and other related factors. In some implementations, the alternative payment section 222 may include a retailer credit account and/or a purchase order account, a gift card payment, check and/or money orders, or other possible payment types that enable the customer to transfer monetary funds to the merchant. Some of the payment types included in the alternative payment section 222 may require the customer to visit another web page and supply information. After the customer selects a payment type, he may submit his choice by selecting a "continue" button 224.

One or more of the payment types offered in the payment sections may be designated as preferred payment types. A customer selection of the preferred payment type may be advantageous for the merchant and provide increased profitability, less risk (e.g., fraud), or other merchant benefits. For example, a preferred payment type may have a high payment assurance (e.g., fraud protection) or fulfillment expectation, which may make the payment type desirable for the merchant when transacting with a customer having previously unfulfilled payments. The preferred payment types may include a reward, which may be transferred to the customer when the preferred payment type is used to complete a transaction.

In embodiments, the rewards may vary based on many factors such as customer information, the elements being purchased, or other factors. In addition, rewards may be anything the merchant provides the customer as an incentive for selecting the preferred payment type. For example, the reward may be a discount on the current purchase, a gift card, points that are redeemable for a future reward, expedited or reduced rate shipping, gift wrapping, no interest for a specified timeframe, or any other reward which may incentivize a customer to select the preferred payment type.

In an illustrative example, the reward generator 124 may create a reward for a customer of ten percent off the pending transaction total. The reward presenter 126 may indicate that the customer must select the preferred payment type, such as the merchant sponsored credit card, and make it the customer's default purchase type after using it to complete the pending transaction. In addition, the reward information section 204 may indicate the total price after the savings have been applied to the regular purchase price and/or the amount saved after the reward is issued, thus enabling the customer to see the actual savings.

In another embodiment, the reward generator 134 may create a reward for a customer when a preferred payment type associated with the customer has been inactive for a period of time. For example, the customer may have recently stopped using the merchant credit card (preferred payment type) and switched to another credit card. The merchant may offer a reward to create an incentive for the customer to use the merchant credit card again. The merchant may require the customer to make the preferred payment type the customer's default payment type in order for the customer to receive the reward.

In another illustrative example, the reward generator 124 may create a reward for signing up for the preferred payment type, such as the merchant credit card. The reward presenter 126 may display the reward in the reward information section 204, which may indicate, for example, that the customer is eligible for a $25 gift card and six months with no interest on the purchase if the customer signs up for the merchant credit card and uses it to complete the pending purchase.

Ideally, a customer may be influenced by a reward and desire to apply for the preferred payment type and receive the reward. In some embodiments, the customer may select the link 208 and be rerouted to another web page, as described below with reference to FIG. 3, that enables the customer to apply for the preferred payment type. In other embodiments, the checkout page, or other techniques, including text and voice communications may allow the customer to apply for the preferred payment.

Figure 3:
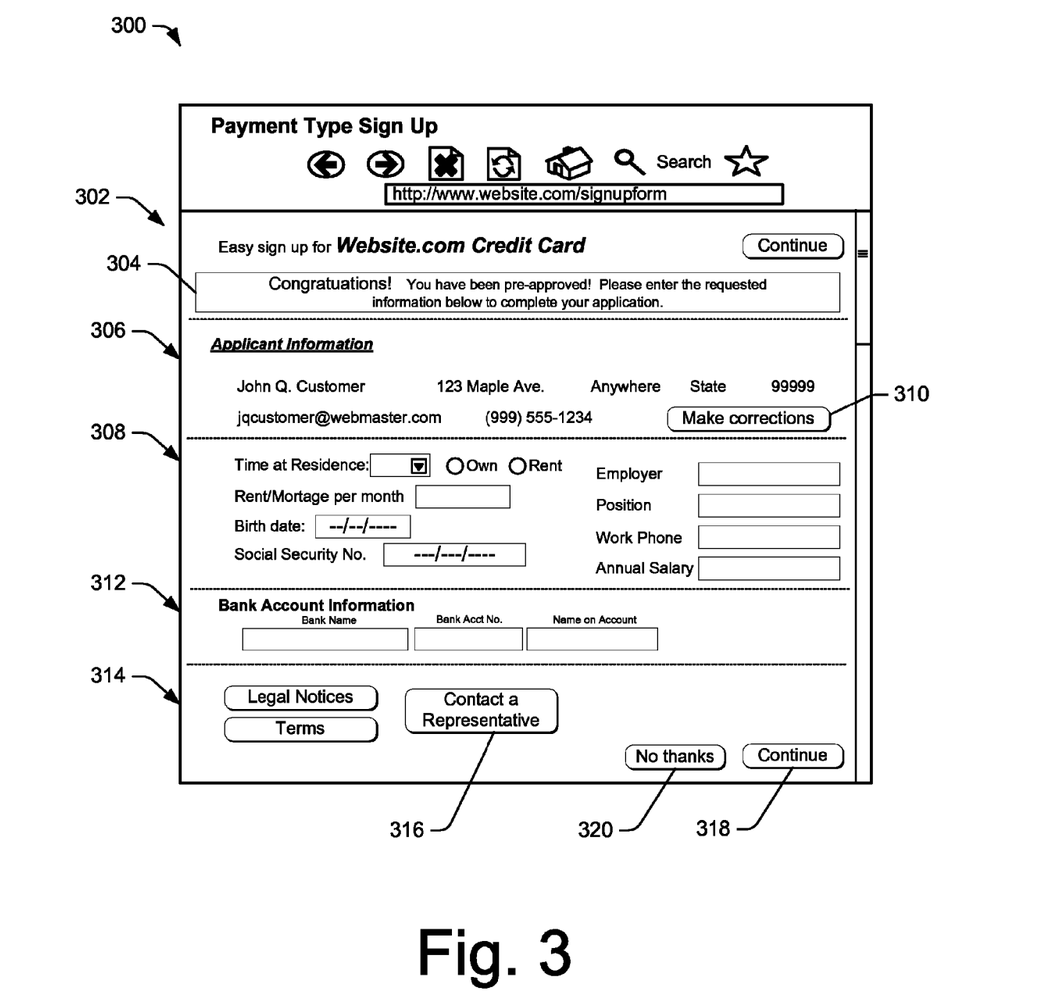
FIG. 3 illustrates an example screen rendering of an e-commerce payment type sign-up form for obtaining customer data for a preferred payment type.

FIG. 3 illustrates an example screen rendering of an e-commerce payment type sign-up form 300 for obtaining customer data for a preferred payment type. Generally speaking, the sign-up form 300 is provided to allow the customer to quickly and easily apply for the preferred payment type, such as a credit card sponsored by the merchant. In some implementations the merchant may provide the sign-up form as a web page on the merchant's website 106. Alternatively, the merchant's website 106 may direct the customer to a third party website via a link, such as the website of a bank that provides the preferred payment type. The sign-up form 300 may include a message pane 302 that provides instructions or messages for the customer (e.g., applicant). In some instances, the message pane 302 may include a message box 304, such as to indicate that the customer has been pre-approved for the requested credit card.

In accordance with embodiments, the sign-up form 300 may include a populated information section 306 and a fill-in section 308. The populated information section 306 may include information that the merchant is able to retrieve and transmit to the sign-up form 300, such as the customer's address information, which may have been entered on the merchant's website 106 as a shipping address or a billing address, stored in an address book associated with the customer, or otherwise retrieved from a customer account in a database associated with the merchant. The populated information section 306 may include the customer's address, email, telephone number(s), and other information. The populated information section 306 may include an editing feature 310 that enables the customer to correct the populated information when a mistake is detected by the customer.

The fill-in section 308 may include data that is not available from the merchant's website 106. For example and without limitation, the fill-in section 308 may include a time at the customer's residence, whether the customer rents or owns his or her residence, rental/mortgage per month, employer information, birth date, and social security information. In some instances, the merchant website 106 may be able to supply at least a portion of the information requested in the fill-in section 308, such as when the merchant website stores the customer's birth date. In such instances, the fields associated with known information may be pre-populated when the customer is presented with the sign-up form 300. The sign-up form 300 may also include a financial institution section 312, which may also be pre-populated in some instances when the merchant is able to provide the requested information.

In embodiments, the sign-up form 300 may include additional information 314 related to the sign-up form (e.g., application), such as legal notices, terms of the payment type, or the like. Alternatively, or in addition, the additional information 314 may be presented directly on the sign-up form, such as in a scrolling text box. The sign-up form 300 may also provide a representative contact feature 316, also referred to as a help button. When the customer has completed the sign-up form, they may select the continue button 318 and submit the application. Alternatively, the customer may discontinue the application by selecting a "no thanks" button 320 or "back" feature. Typically, the customer is redirected to the checkout page 200 after completing the sign-up form, more specifically, after the customer clicks on the continue button 318.

Checkout Manager and Preferred Payment Type Implementation

Figure 4:
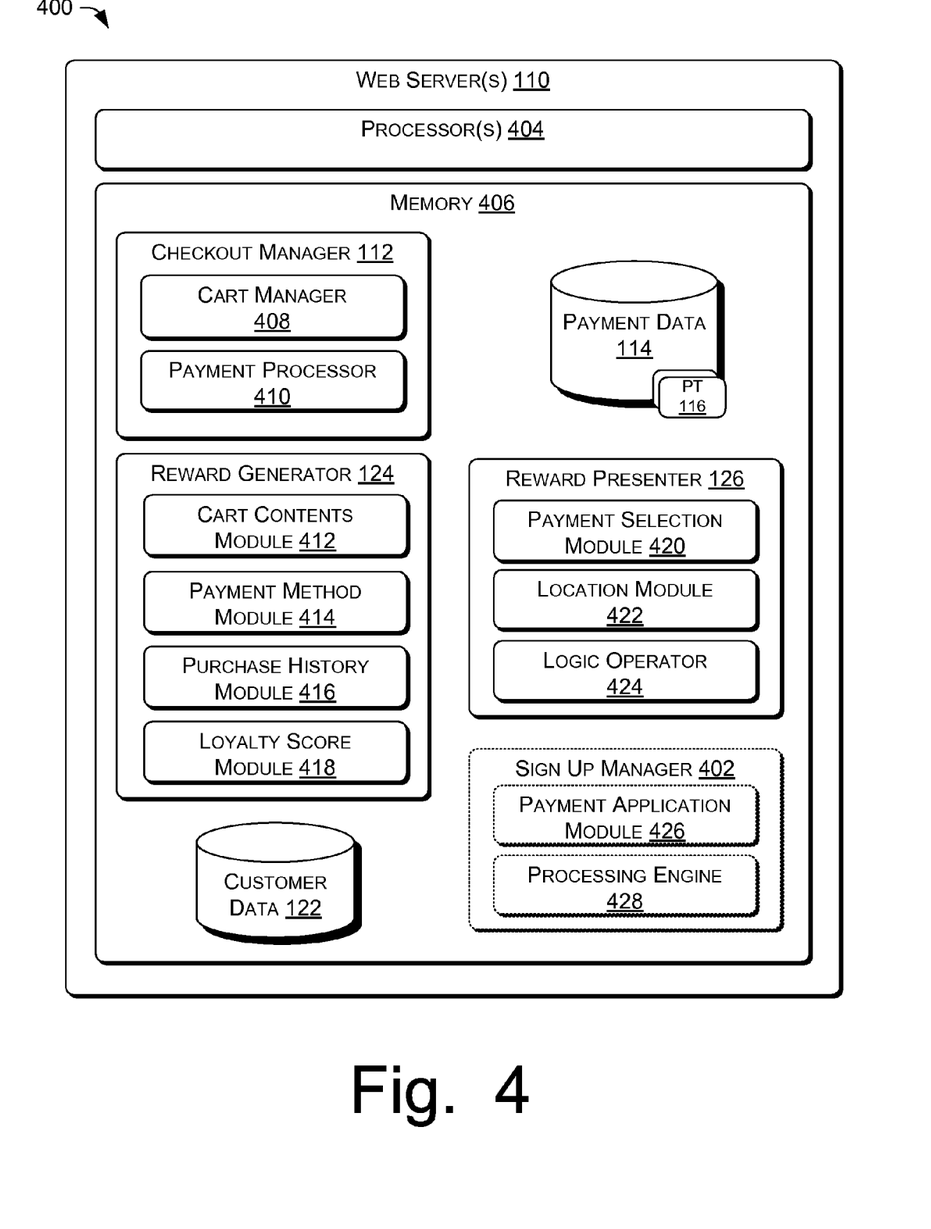
FIG. 4 is a block diagram illustrating embodiments of modules in a checkout manager, reward generator, reward presenter, and optional sign up manager, from FIG. 1.

FIG. 4 illustrates an example implementation 400 of the checkout manager 112, the reward generator 124, reward presenter 126, and an optional sign up manager 402 that are run as software on one or more of the web servers 110(1)-(N). The web servers have processing capabilities and memory suitable to store and execute computer-executable instructions. In this example, the web server(s) 110 include one or more processors 404 and memory 406. The memory 406 may include volatile and/or nonvolatile memory, removable and/or non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The checkout manager 112, the reward generator 124, reward presenter 126, and the optional sign up manager 402 are implemented as software or computer-executable instructions stored in the memory 406 and executed by one or more of the processors 404.

The checkout manager 112 includes a cart manager 408 configured to manage the customer elements during the checkout process. The cart manager 408 may enable the customer to review the selected elements, make changes to the elements, including quantities or other attributes, and select checkout related options, such as gift wrapping. The checkout manager 112 further includes a payment processor 410 for processing the payment type selected by the customer and completing the transaction. The payment processor 410 may enable the customer to submit coupons or other discounts, calculate the total for a transaction, and process the payment for the transaction. In some instances, the payment processor 410 may batch process payments, thus the customer payment may not be initiated immediately after the customer submits his or her payment. In other instances, the payment processor 410 may process the customer's payment after the payment information is submitted, such as after the customer click's the "continue" button 224 on the checkout page 200 as shown in FIG. 2.

The reward generator 124 and the reward presenter 126 each may include a multitude of modules. Generally speaking, the reward generator 126 may analyze customer information, including the customer data 122, to determine a customer score. The customer score may be used to create the reward for a preferred payment type for a customer. A higher customer score may result in a creation of a more valuable reward. The reward may be based on profits realized from the preferred payment type and/or reductions in processing costs associated with the preferred payment type. The customer score may be determined by the various modules included in the reward generator 124. In some implementations, the customer score, as determined by the reward generator 124, may be a measure of customer trustworthiness and/or potential profit margin associated with a customer.

As previously discussed, reward generator 124 generates a reward for one or more payment types provided in the payment data 114. In embodiments, the reward generator 124 may include a cart content module 412 which evaluates the elements in the customer's cart, as determined by the cart manager 408, and assigns a cart content value for the transaction. The reward generator 124 may use the cart content value to determine the reward for one or more preferred payment types. For example, if the customer's cart has high value elements, such as a cart containing an expensive large-screen television and other electronics, the cart content value may be relatively high, and thus trigger a more valuable reward creation by the reward generator 124 as compared to a second cart that contains bargain books and has a low cart content value. Cart value may depend not only on total purchase price, but also on the profit expected from the items in the customer's cart. Profit can be measured in terms of the profit on the sale of the goods in the cart, as well as any other expected or potential benefits (e.g., the possible upsell of related items at or after checkout, service plans, profit sharing from the payment processor, volume discounts, return business by the customer, etc.).

The reward generator 124 may also include a payment method module 414, purchase history module 416, and a loyalty score module 418 to assist in determining the customer score, and thus the value of a reward to be generated by the reward generator 124 based at least in part on the customer data 122. The payment method module 414 may track the payment history of the customer and create a customer credit score, or the like, to determine the risk associated with the providing the reward to the customer. For example, the payment method module 414 may generate a low customer credit score for a customer associated with a check having insufficient funds. In other embodiments, the payment method module 414 may be in communication with a third party to obtain the customer credit score, or other information, that may indicate a customer's ability and/or likelihood of fulfilling a payment obligation.

The purchase history module 416 may measure the purchased elements associated with the customer to generate the purchase history score. For example, a customer who spends $500 on element purchases each year may receive a higher purchase history score, and thus a better reward, than a customer who has no purchase history or a history of spending $100 per year. The purchase history module 416 may also consider, without limitation, factors such as the profit margin on the elements, range of elements purchased, shipping charges to the customer, coupon usage, or other factors that may make a customer relationship more valuable than a relationship with another customer. Finally, the loyalty score module 418 may calculate a loyalty score, such as by determining a frequency of customer visits to generate a value to assist in generating a reward for the customer. The customer score may be calculated using one or more of the cart content value, the customer credit score, the purchase history score, or the loyalty score.

As discussed above, embodiments may also include the offer presenter 126 which may have a number of modules such as a payment selection module 420, a location module 422, and a logic operator 424. The payment selection module 420 may present a reward based on the payment type selected by the customer. For example, the customer may select a credit card from a drop down list in the credit card section 210 in FIG. 2. When the customer selects a credit card, the payment selection module 420 may update a message box with information about reward associated with the payment type. In some cases, the payment selection module 420 may indicate that a selected payment type does not include a reward. In addition or alternatively, the payment selection module 420 may suggest using a preferred payment type when the customer selects a credit card as a payment type.

The location module 422 determines the location for the reward. In accordance with embodiments, the location module 422 enables pop-up or scroll over messaging, java enabled messaging, or the like to communicate reward information to the customer. The rewards may be displayed on the checkout page 200, on a pop-up window, via an audible message, or by other communication techniques. The logic operator 424 may determine conditions for displaying the offer. For example, the customer may already have the preferred payment type, such as a merchant credit card. In one instance, the customer may not have the credit card associated with the customer address, and thus the logic operator may present the reward with a message to indicate an updated association with the customer address is necessary to receive the reward. The logic operator 424 may also facilitate providing a message box that displays the outcome of a transaction when the customer receives the reward, such as the final price after a reward is applied, which includes a price reduction.

In some embodiments of the disclosure, the optional sign up manager 402 stored in the memory 406 includes a payment application module 426 and a processing engine 428. Alternatively, the sign up manager 402, or a portion thereof, may be hosted by a third party, such as a bank offering the preferred payment type associated with the sign-up. The payment application module 426 enables a customer to input information necessary to complete the payment type application, such as the sign-up form 300. The processing engine 428 processes the information collected in the payment application module 426 to determine whether the customer is eligible for the payment type and otherwise facilitate providing the customer with access to the preferred payment type.

Figure 5:
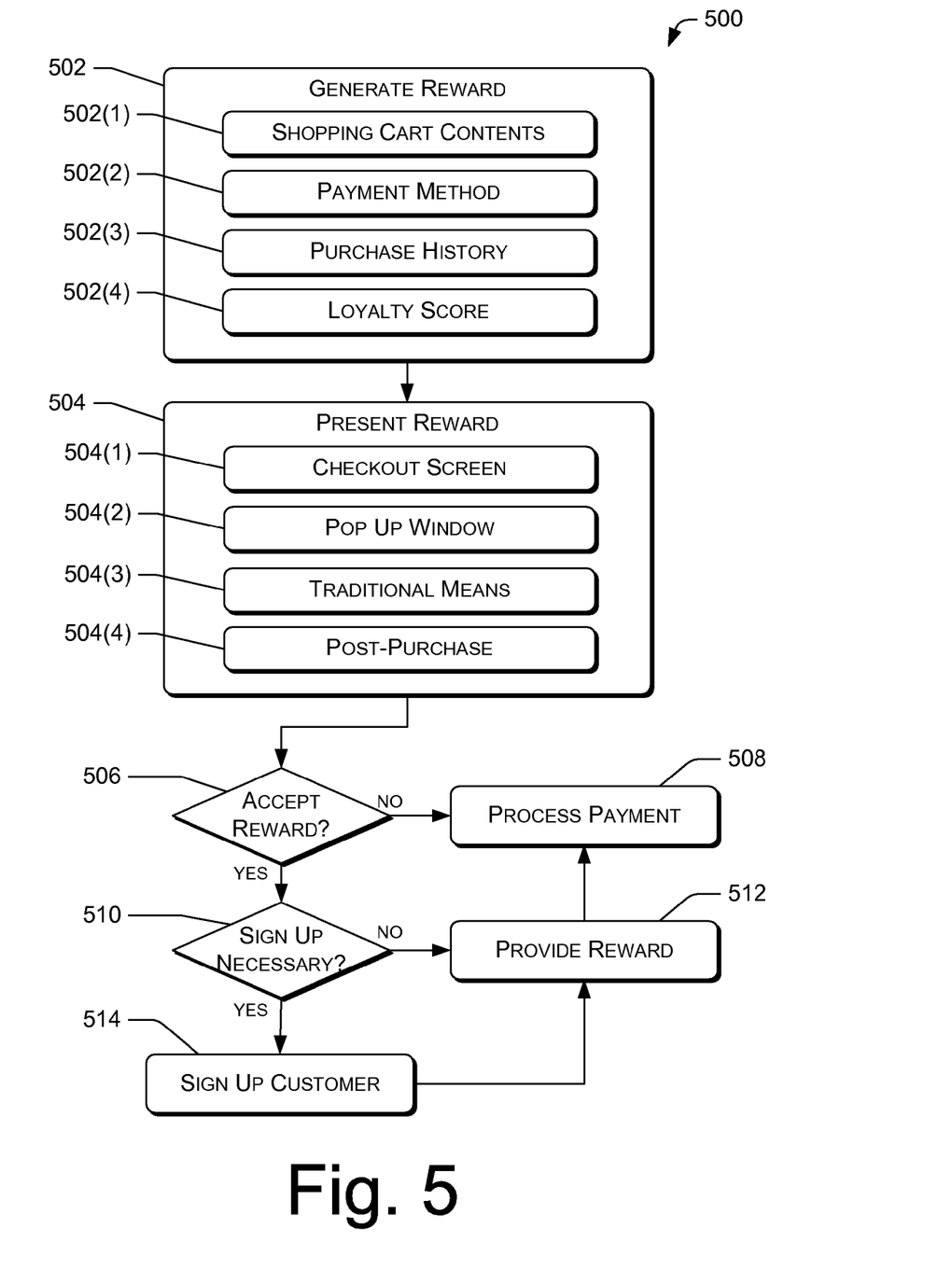
FIG. 5 is a flow diagram of an illustrative process for providing a preferred payment type, including generating a reward and presenting the reward on an e-commerce website.

FIG. 5 is a flow diagram of an illustrative process 500 for providing a preferred payment type, including generating a reward and presenting the reward on an e-commerce website. The process is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

For discussion purposes, the process 500 is described with reference to the architecture 100 of FIG. 1, and the system of FIG. 4. In particular, many acts described below may be implemented and performed by the checkout manager 112, reward generator 124, and reward presenter 126.

At 502, a reward is generated for a consumer to consider, either during a transaction or generically when visiting an e-commerce site. Reward generation may take into account one or more factors. One factor is the cart contents for the customer (at 502(1)), including the elements and any additional purchase considerations. Typically, more valuable cart contents may improve the likelihood of the customer receiving a more valuable reward. Another factor is the payment method (502(2)), which may analyze the payment history of the customer. A good payment history, such as one without an overdraft or late payment may also improve the likelihood of the customer receiving a more valuable reward. In addition or alternatively, payment information may also make additional payment options available to the customer. Still another factor is the purchase history (502(3)), which may analyze purchase information associated with the customer. A purchase history including large purchases and frequent visits to the merchant website 106 may improve the rewards available to the customer. Loyalty score (502(4)) is another factor that may improve the customer's reward and may be influenced by the frequency of customer visits or duration of a relationship with the merchant.

The reward is presented to the customer at 504. Reward presentation may use one or more techniques to communicate the reward to the customer. One technique is to present the reward within the checkout screen (at 504(1)). The reward presenter may place text next to a preferred payment type or include roll-over text or other interactive textual effects. Rewards may also be presented using a message box within the checkout screen to communicate savings to the customer when the reward is applied to the pending purchase, among other reward presentations possible on the checkout page 200. At 504(2), a pop-up window or secondary web page may be another technique for presenting a reward to the customer. In some instances, the customer may click on a link or button to learn more about an available reward. The requested information may pop-up in a second page, which may be easily distinguishable from the checkout page 200 to avoid customer confusion.

Additional reward presentation techniques include using traditional means (504(3)) to communicate rewards and offers to customers. Traditional means may include printing a letter and mailing it to the customer. In addition or alternatively, rewards may be presented to the customer over the telephone or via an email sent directly to the customer. A post-purchase technique (504(4)) may also facilitate presentation of the reward. For example, when payments are batch processed, such as by the payment processor 410, the customer may click on the continue button 224 to complete a purchase without actually being billed for the purchase until a later point in time. Before the customer is billed, such as before the customer logs off the merchant website 106, the customer may be presented with a last chance offer to reduce the purchase price. If the customer accepts the reward, the merchant may edit the purchase price, such as by canceling the initial purchase via the payment processor 410 and creating a new payment submission using the preferred payment type. Other embodiments may include providing the customer with other rewards, such as points, coupons, shipping upgrades, etc., during a last chance offer for the preferred payment method.

Additional embodiments include determining a customer interest in a preferred payment type and creating an additional offer for the customer based on the determined customer interest. For example, the checkout manager 112 may determine a customer interest as being high if the customer views the terms and conditions for a preferred payment type. In addition or alternatively, customer interaction with help files or other links may indicate customer interest. The determined customer interest may prompt the e-commerce company to create a second offer, such as a pop-up window, when the customer navigates away from a previous offer, such as when the customer selects the "back" button on the browser 132 or a "continue shopping" link on the webpage 134. The previous offer may be associated with cart abandonment or abandonment of a preferred payment type application.

In accordance with embodiments, the process 500 includes a decision 506 to determine if the customer accepts the reward. If the customer does not accept the reward, the customer's payment is processed at 508. If the customer accepts the reward at the decision 506, the process 500 advances to a second decision 510 to determine if the customer needs to sign-up for the preferred payment type to receive the reward, such as by using the optional sign-up manager 402. For example, the reward may be associated with signing up for a credit card and using it for a pending purchase. If the sign-up is not necessary, the customer may be provided with the reward at 512 and process a payment type at 508. If the sign-up is necessary, the customer signs up for the payment type, such as by using the sign-up form 300. If the customer receives the payment type (i.e., is approved), the customer may receive the reward at 512 and use the new payment type to process the payment at 508.

Alternative Embodiments

Figure 6:
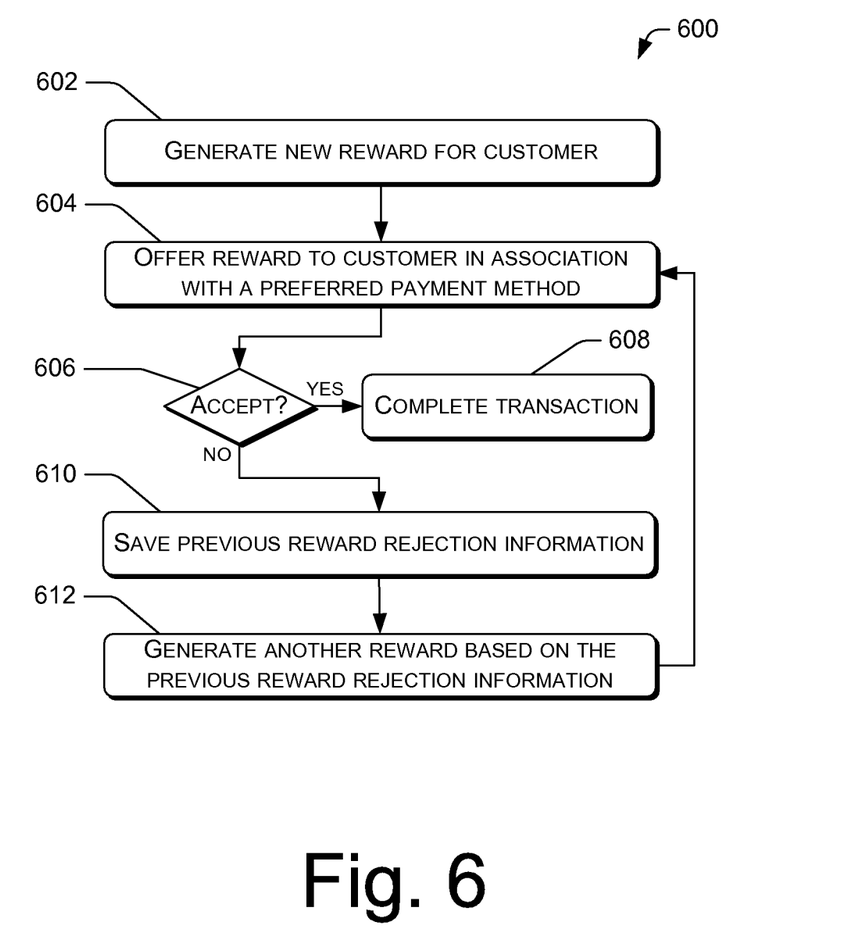
FIG. 6 is a flow diagram of an illustrative process for providing dynamic reward offers for a preferred payment type.

FIG. 6 is a flow diagram of an illustrative process 600 for providing dynamic reward offers for a preferred payment type. Similar to FIG. 5, the process 600 is illustrated as a collection of blocks in a logical flow graph, which represent a sequence of operations that can be implemented in hardware, software, or a combination thereof. The acts described below may be implemented and performed by the checkout manager 112, reward generator 124, and reward presenter 126.

During a visit to the merchant website 106, the customer may initiate the creation of a first reward at 602, which is created by the reward generator 124. In some instances, the first reward may be based on customer attributes as discussed in relation to the reward generator 124. Alternatively, the first reward may be the same for most customers. In an example, the reward generator 124 may generate a $10 reward as an incentive for a first time customer to sign up for the merchant credit card. The reward is presented to the customer at 604 using one or more of various techniques described in association with 504 above. Thus, the exemplary $10 coupon may be offered to the customer using a message box. At a decision 606, the customer may choose to accept the reward and complete the transaction at 608. Alternatively, the customer may not accept the offer and may complete the purchase without using a preferred payment type.

The previous reward information, created at 602, may be stored at 610, such as on the memory 406 in the payment data 114. The stored reward information may enable retrieval of the information at a later time. When the customer returns to the merchant's website during a subsequent visit, a second reward may be generated for the customer at 612. The second reward may be based on the stored reward information 610. The second reward may be greater than the first reward ($10 coupon) that the customer rejected to motivate the customer to accept the second reward (e.g., $15 coupon). Therefore, the process 600 may enable the merchant to offer dynamic rewards which vary by customer visit and are generated based on prior interactions with the customer. In other embodiments, reward information stored at 610 may be used to adjust subsequent offers for other customers. For example, if the merchant determines a reward has a low conversion rate (i.e., customers are not accepting the reward), the merchant, via the reward generator 124, may use the stored information at 610 to modify the generated rewards for other customers.

Figure 7:
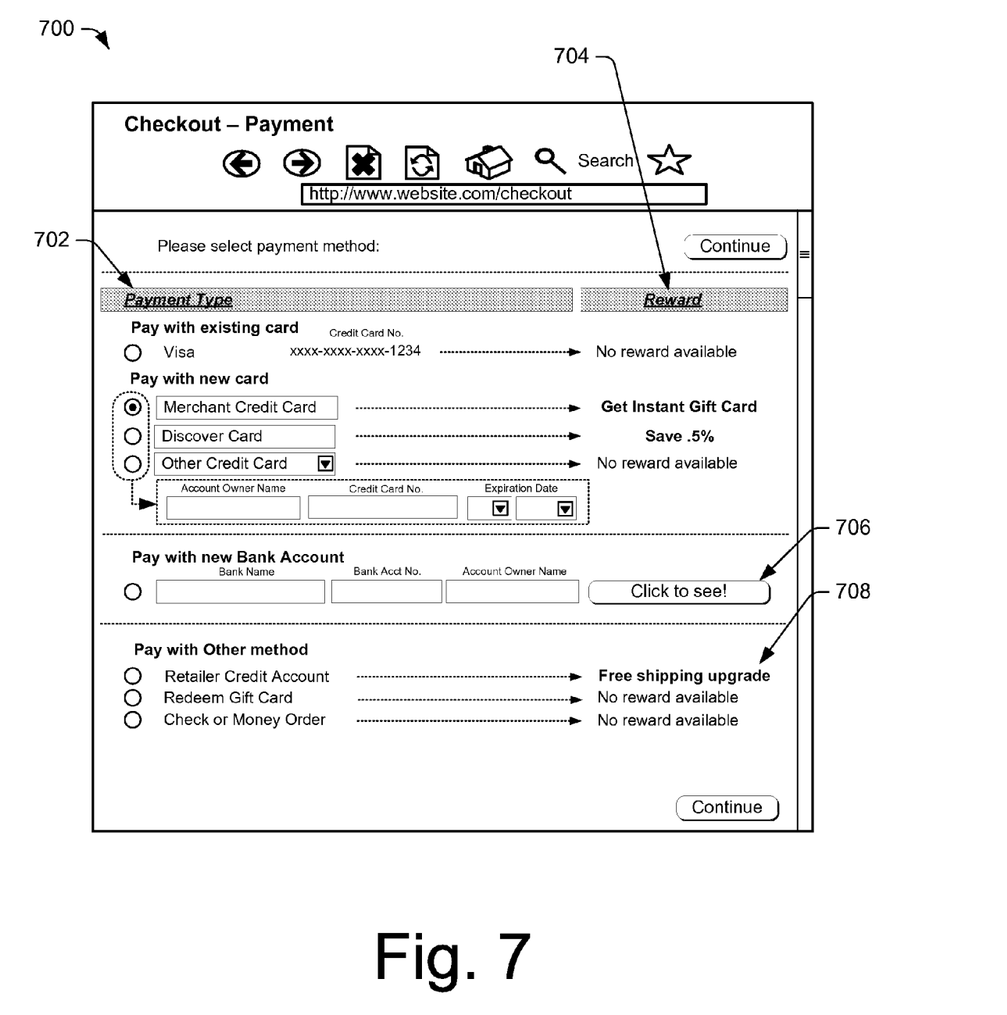
FIG. 7 illustrates another example screen rendering of an e-commerce checkout page including a plurality of payment options, each having a reward identifier and/or an associated reward.

FIG. 7 illustrates another example screen rendering of an e-commerce checkout page 700 including a plurality of payment options, each having a reward identifier and/or an associated reward. The checkout page 700 includes a payment type section 702 and a reward section 704. The payment type section 702 includes the payment types available to the customer, including preferred payment types. The preferred payment types include an associated reward. For example, the merchant credit card may include a reward of a free gift card while the Discover Card® may include a reward of 0.5% off the purchase price for the pending transaction. Some other payment types may not include rewards, and further may indicate that no reward is available for the payment type. In additional embodiments, the reward may not be immediately visible to the customer. For example, a link or button 706 may reveal the reward via a second web page, email, or other communication means. In addition, a shipping upgrade 708 may be offered to the customer as a reward for using a preferred payment method.

One will appreciate that the embodiments in accordance with the disclosure may include varying the rewards presented on the checkout page 700 based on a plurality of factors. For example, the customer data 122 may be data mined to determine that a customer is trustworthy (such as by executing modules in the record generator 124 as shown in FIG. 4) and will likely complete an e-check process with little risk to the merchant. This knowledge may motivate the merchant, via the reward generator 124, to create a reward for the customer for initiating or using an e-check payment type. In addition or alternatively, the reward presenter 126 may vary the presentation of the rewards based on the payment types available for a particular purchase. For example, if multiple preferred payment types are available for a purchase, the reward presenter 126 may not display the information box 204 as shown in FIG. 2 to save space on the checkout page, avoid distracting the customer, or for another strategic reason.

In an illustrative example, the checkout page 700 may display a reward in the reward section 704 associated with an e-check account sign-up. The reward may include entering the customer into a sweepstakes drawing which may result in the customer winning a prize, such as a new car, vacation, or shopping spree. The merchant may also provide the customer with sweepstakes entries for each time they use a preferred payment method. In some instances, multiple rewards may be used in combination.

In yet another illustrative example, the merchant may receive profits from a particular payment method through an agreement with a third party, such as a bank. The bank may provide the merchant with a percentage of the transaction, fixed value, or other portion of each transaction that is completed using the bank's payment type. The merchant may choose to pass on a portion of the profits to the customer in the form of a reward to motivate the customer to use the preferred payment type. This may allow third parties to market their payment types and increase their market share over other payment providers, banks, or credit providers.

In accordance with embodiments of the disclosure, the merchant may create an awards program that creates an incentive for a customer to obtain and use a preferred payment type, such as a merchant credit card. For example, the website 106 may present a reward associated with signing up and using the merchant credit card. Subsequent purchases may be encouraged by providing the customer with miles, points, or other tangible or non-tangible units which are redeemable for useful rewards. For example, the customer may obtain points that are distributed proportionally with the sale price of the pending transaction. The number of points available for a pending purchase may be displayed in the reward information section 204. The description 206 may indicate the number of additional points needed for the customer to redeem her points for the useful reward. Additional points may be provided to the customer when the preferred payment type is set as the default payment type. In still further embodiments, additional points may be offered to the customer for transactions which do not occur on the merchant's website 106.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A checkout method, comprising:
 transmitting to a customer device payment options available for selection by a customer, using the customer device, for completing a transaction with a merchant, wherein at least one of the payment options is a preferred payment option for the merchant;
 generating, by one or more computing devices, a reward for the customer, the reward associated with the at least one preferred payment option and based at least in part on a profit of the transaction to be received by the merchant for accepting the at least one preferred payment option, the profit being based on one or more items in a shopping cart associated with the customer;
 transmitting to the customer device an indication of the reward to the customer in association with the at least one preferred payment option, the reward provided by the merchant;
 in response to receiving a selection of the at least one preferred payment option, determining whether the at least one preferred payment option is included in an account associated with the customer;
 in response to determining that the at least one preferred payment option is not included in the account and at a time after receiving the selection of the at least one preferred payment option:
  populating an application for the at least one preferred payment option with customer information that is stored in the account; and
  providing the reward or an indication of the reward to the customer via the customer device after the customer uses the at least one preferred payment option to complete the transaction; and
 in response to determining that the at least one preferred payment option is included in the account, providing the reward or an indication of the reward to the customer via the customer device after the customer uses the at least one preferred payment option to complete the transaction.

2. The method as recited in claim 1, wherein populating the application includes retrieving customer data associated with the account from a database.

3. The method as recited in claim 1, wherein the at least one preferred payment option is a credit card associated with the merchant.

4. The method as recited in claim 1, wherein the reward is based at least in part on a reduction in processing costs associated with the selection of the preferred payment option compared to selection of another payment option.

5. The method as recited in claim 1, wherein the profit is further based on an upsell of other items related to the one or more items in the shopping cart.

6. A method, comprising:
transmitting to a customer device multiple payment options available for selection by a customer, using the customer device, for completing a transaction with a merchant, wherein at least one of the payment options is a preferred payment type;
determining a cost for processing individual ones of the payment options;
determining a profit margin associated with one or more items included in an order associated with the transaction;
determining, by one or more computing devices, a reward associated with the preferred payment type based at least in part on the cost determined for processing individual ones of the payment options, wherein a value of the reward is determined from the profit margin associated with the one or more items;
transmitting, to the customer device and prior to selection of the preferred payment type, an indication of the reward in connection with the preferred payment type, wherein the reward comprises an offer in exchange for using the preferred payment type to complete the transaction; and
providing the reward or an indication of the reward to the customer via the customer device after the customer selects the preferred payment type to complete the transaction.

7. The method as recited in claim 6, wherein selecting the preferred payment type includes making the preferred payment type a default payment type.

8. The method as recited in claim 6, wherein selecting the preferred payment type includes applying for the preferred payment type using a sign up form.

9. The method as recited in claim 8, wherein the sign up form includes pre-populated customer information.

10. The method as recited in claim 6, wherein the transmitting the indication of the reward includes calculating a transaction total after the reward has been applied to a pending transaction.

11. The method as recited in claim 6, wherein the reward includes providing points proportional to a transaction total, the points being redeemable for a merchant product.

12. A method comprising:
obtaining, by at least one of one or more hardware processors, a transaction history for a customer that includes a payment history with a merchant, wherein the payment history is obtained from payment data that is stored in memory, and wherein the payment history indicates a rejection of a previous reward offered by the merchant to the customer to incentivize the customer to use a payment type;
determining, by at least one of the one or more hardware processors, a new reward supplied and offered by the merchant, the new reward based at least in part on a value of the previous reward that was rejected by the customer and a profit of a pending transaction to be received by the merchant for accepting the payment type, the profit being based on one or more items included in an order associated with the pending transaction; and
transmitting to a customer device an indication of the new reward in an offer to use the payment type to satisfy the pending transaction.

13. The method as recited in claim 12, wherein the determining the new reward includes calculating a cost to the merchant for processing the payment type.

14. The method as recited in claim 12, further comprising providing the customer with the new reward or the indication of the new reward via the customer device during the pending transaction if the customer uses the payment type to complete the pending transaction.

15. The method as recited in claim 12, further comprising providing the customer with the new reward or the indication of the new reward via the customer device when the customer designates the payment type as a default payment type.

16. A system comprising:
one or more processors; and
memory to store computer-executable instructions that, when executed by the one or more processors, cause the one or more processors to perform acts comprising:
transmitting to a customer device payment options available for selection by a customer, using the customer device, for completing a transaction with a merchant, wherein at least one of the payment options is a preferred payment option for the merchant;
generating a reward for the customer, the reward associated with the at least one preferred payment option and based at least in part on a profit of the transaction to be received by the merchant for accepting the at least one preferred payment option, the profit being based on one or more items in a shopping cart associated with the customer;
transmitting to the customer device an indication of the reward to the customer in association with the at least one preferred payment option, the reward provided by the merchant;
in response to receiving a selection of the at least one preferred payment option, determining whether the at least one preferred payment option is included in an account associated with the customer;
in response to determining that the at least one preferred payment option is not included in the account and at a time after receiving the selection of the at least one preferred payment option:
populating an application for the at least one preferred payment option with customer information that is stored in the account; and
providing the reward or an indication of the reward to the customer via the customer device after the customer uses the at least one preferred payment option to complete the transaction; and
in response to determining that the at least one preferred payment option is included in the account, providing the reward or an indication of the reward to the customer via the customer device after the customer uses the at least one preferred payment option to complete the transaction.

17. The system as recited in claim 16, wherein the providing the reward or the indication of the reward is further conditioned on the customer making the at least one preferred payment option a default payment option.

18. The system as recited in claim 16, the acts further comprising calculating a relative processing cost by comparing the cost for processing one of the payment options with the cost for processing another one of the payment options, the relative processing cost used, at least in part, to determine a value of the reward.

19. The system as recited in claim 16, the acts further comprising creating a customer score based at least in part on previous payment transactions between the customer and the merchant, and wherein a value of the reward is based at least in part on the customer score.

20. The system as recited in claim 19, wherein the creating the customer score includes retrieving previously presented reward data from a previous customer transaction, the previously presented reward data used to determine the value of the reward.

21. A system comprising:
one or more processors; and
memory to store computer-executable instructions that, when executed by the one or more processors, cause the one or more processors to perform acts comprising:
obtaining a transaction history for a customer that includes a payment history with a merchant, wherein the payment history is obtained from payment data that is stored in the memory, and wherein the payment history indicates a rejection of a previous reward offered by the merchant to the customer to incentivize the customer to use a payment type;
determining a new reward supplied and offered by the merchant, the new reward based at least in part on a value of the previous reward that was rejected by the customer and a profit of a pending transaction to be received by the merchant for accepting the payment type, the profit being based on one or more items included in an order associated with the pending transaction; and
transmitting to a customer device an indication of the new reward in an offer to use the payment type to satisfy the pending transaction.

22. The system as recited in claim 21, the acts further comprising transmitting the new reward or the indication of the new reward to a user via the customer device after the user uses the payment type to complete the pending transaction.

23. The system as recited in claim 22, wherein the transmitting the new reward or the indication of the new reward to the user is further conditioned on the user making the payment type a default payment type in addition to the user using the payment type to complete the pending transaction.

24. The system as recited in claim 22, the acts further comprising applying the reward to satisfy at least a portion of an amount due for the pending transaction.

25. The system as recited in claim 21, wherein the transmitting to the customer device the indication of the new reward is conditioned upon a determination that the payment type has not been used to conduct a transaction with the merchant for a predetermined period of time.

* * * * *